(No Model.)　　　　　　　　C. MAUL.　　　　3 Sheets—Sheet 1.
CULTIVATOR.
No. 529,457.　　　　　　　　　　Patented Nov. 20, 1894.
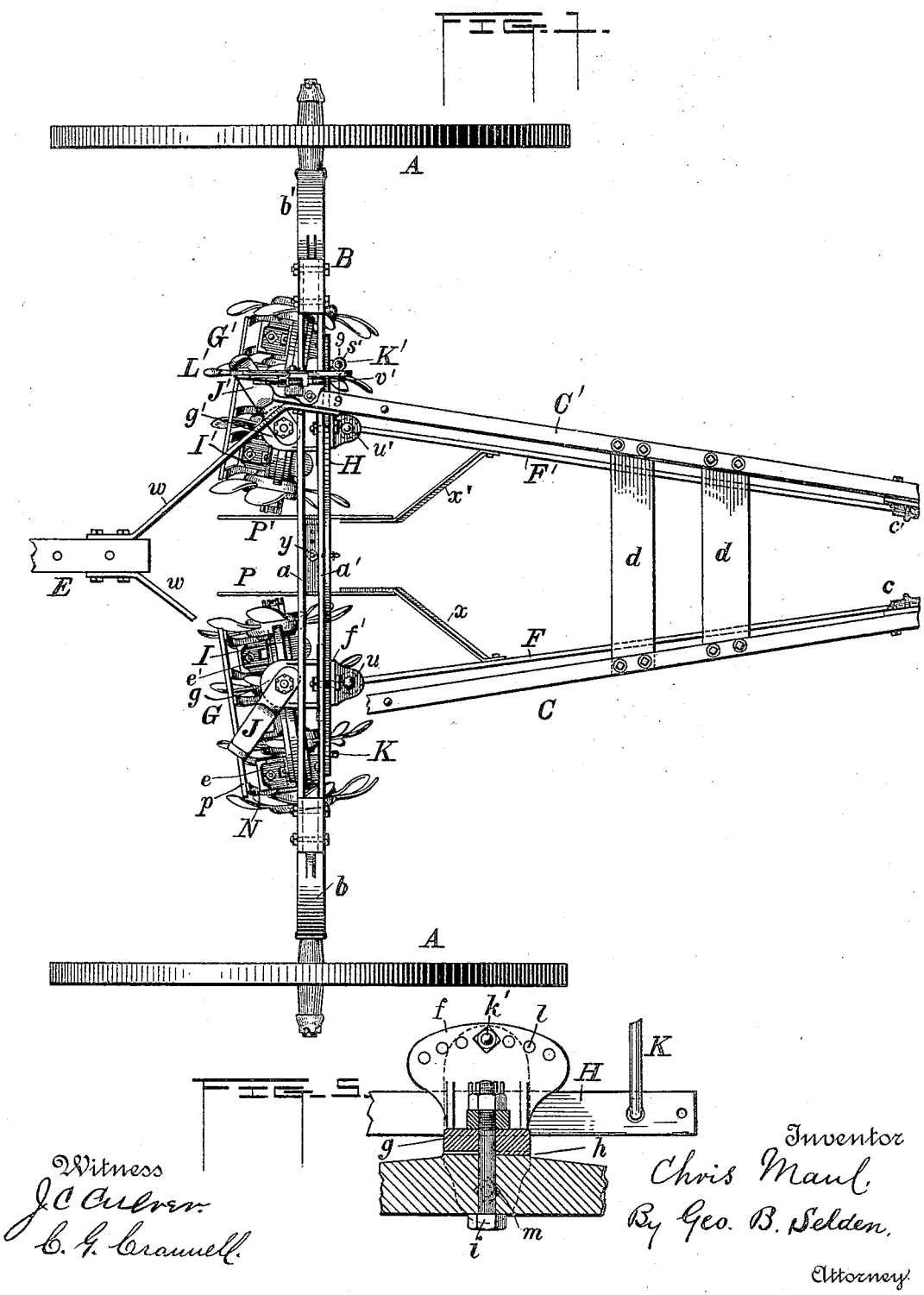
Witness
J. C. Culver.
C. G. Cromwell.
Inventor
Chris Maul,
By Geo. B. Selden,
Attorney.

(No Model.) 3 Sheets—Sheet 2.
C. MAUL.
CULTIVATOR.
No. 529,457. Patented Nov. 20, 1894.
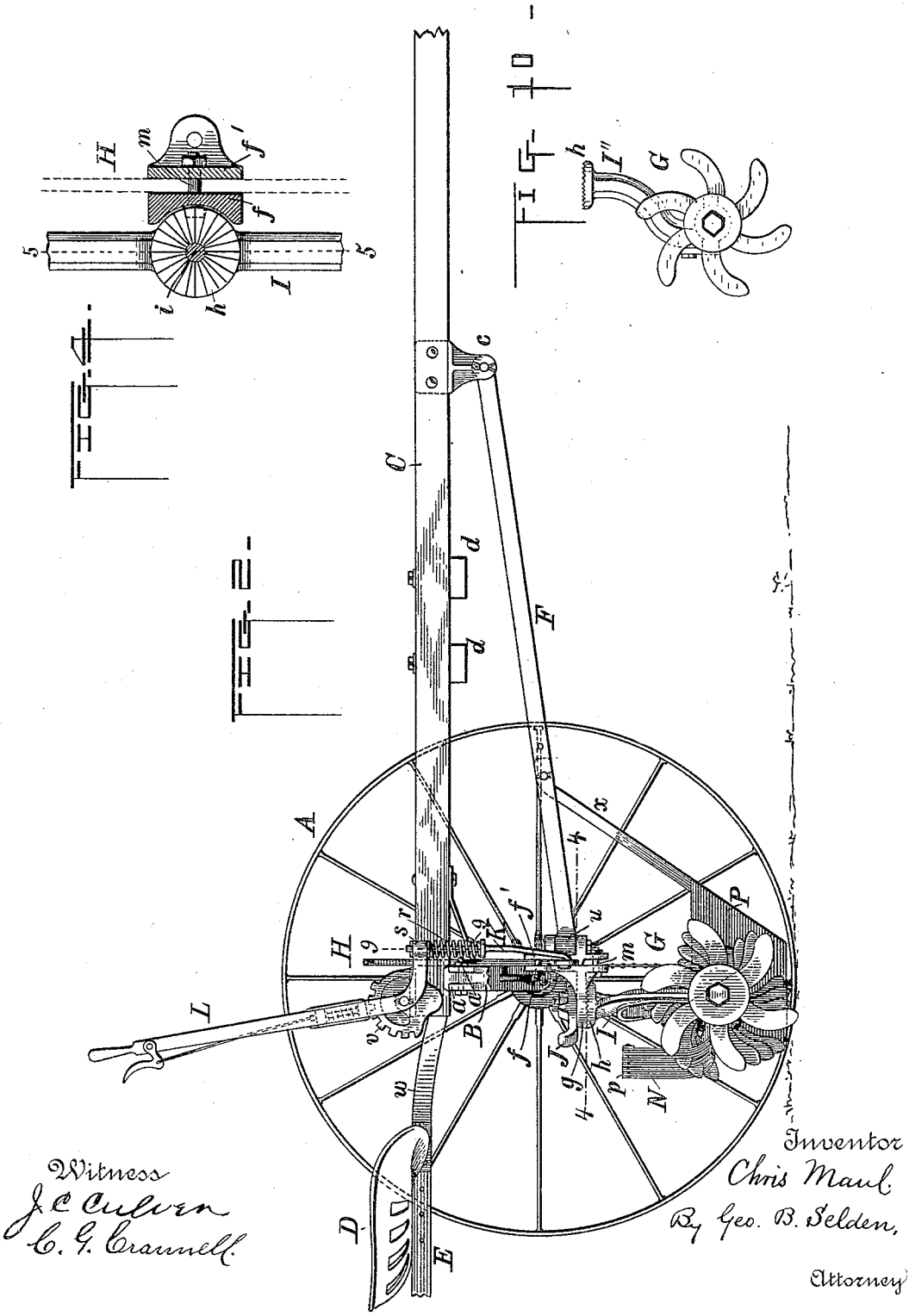
Witness
J. C. Culver
C. G. Crannell
Inventor
Chris Maul.
By Geo. B. Selden,
Attorney (No Model.) 3 Sheets—Sheet 3.
C. MAUL.
CULTIVATOR.
No. 529,457. Patented Nov. 20, 1894.
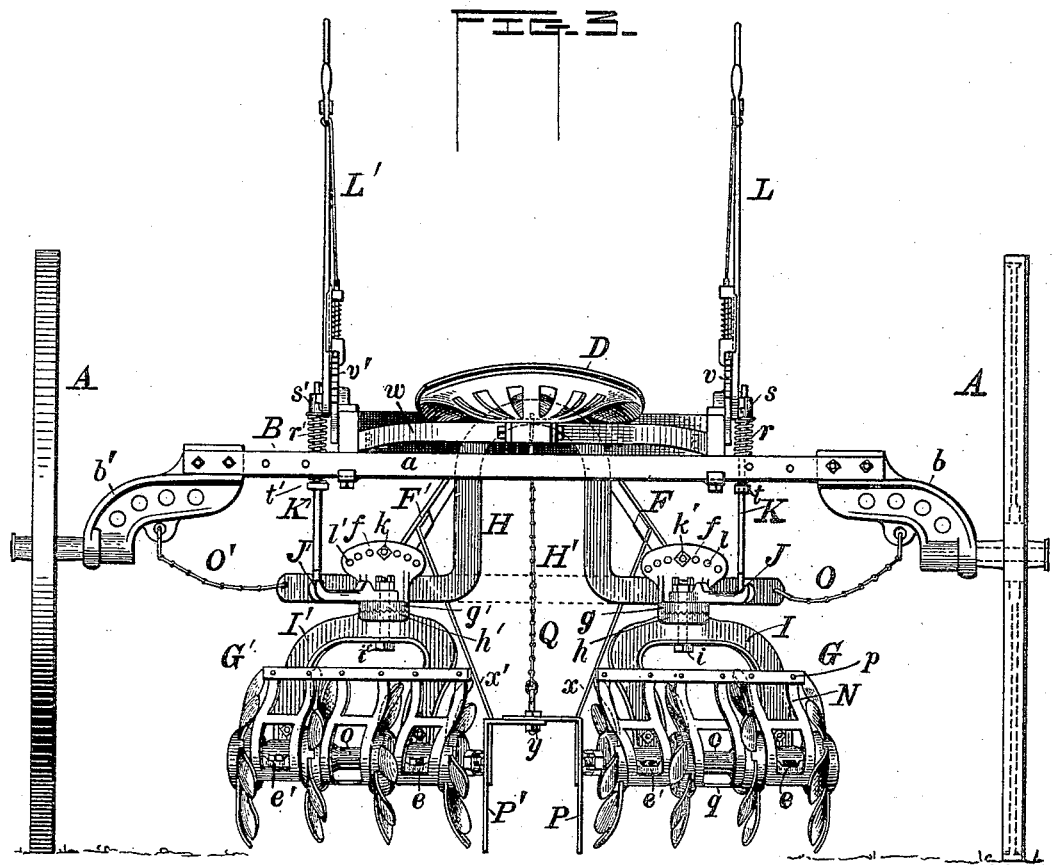
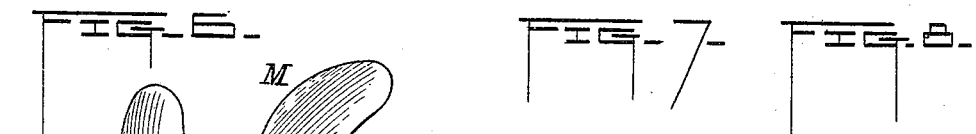
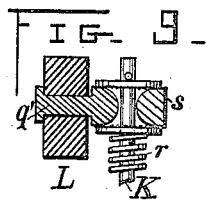
Witness
J. C. Culver
C. G. Cramwell
Inventor
Chris Maul,
By Geo. B. Selden,
Attorney

UNITED STATES PATENT OFFICE.

CHRIS MAUL, OF BROCKPORT, NEW YORK, ASSIGNOR TO THE D. S. MORGAN & COMPANY, OF SAME PLACE.

CULTIVATOR.

SPECIFICATION forming part of Letters Patent No. 529,457, dated November 20, 1894.

Application filed November 15, 1893. Serial No. 491,036. (No model.)

*To all whom it may concern:*

Be it known that I, CHRIS MAUL, a citizen of the United States, residing at Brockport, in the county of Monroe, in the State of New York, have invented certain Improvements in Cultivators, of which the following is a specification, reference being had to the accompanying drawings.

My invention relates to certain improvements in cultivators, which improvements are fully described and illustrated in the following specification and the accompanying drawings, the novel features thereof being specified in the claims annexed to the said specification.

In the accompanying drawings representing a cultivator embodying my improvements—Figure 1 is a plan view. Fig. 2 is a side elevation. Fig. 3 is a rear elevation. Fig. 4 is a plan view of a portion of the arch, showing its head with radial teeth, and also a section through the plates by which the arch is attached to the yoke. Fig. 5 is a vertical section through the upper part of the arch, on the line 5—5, Fig. 4, showing the plates in front of such line. Fig. 6 is a side view of the spading teeth. Figs. 7 and 8 represent the collars which support the teeth. Fig. 9 is a section on the line 9—9, Figs. 1 and 2. Fig. 10 represents a modification.

In the accompanying drawings A A are the wheels; B, the axle; C C′, the divided pole or tongue; D, the driver's seat; E, the seat-support; F F′, the draw-bars and G G′ the sections or gangs of radial curved spading teeth.

The axle B is composed of the arms or brackets $b\ b'$, provided with the journals on which the wheels revolve, and the parallel bars $a\ a'$, which combine strength with lightness. The gangs of spading teeth are connected together by the yoke H, placed in front of the axle, and connected to the rear ends of the draw-bars F F′, the forward ends of which are pivoted to the divided pole as indicated at $c\ c'$.

$d$ represents suitable cross-bracing for the tongue, which is provided with means of attaching the whiffletrees in any usual manner.

The gangs are attached to the yoke H by the arches, I I′, which at their lower ends are provided with suitable journal-boxes $e\ e'$, in which the gangs of spading teeth revolve. The arches carrying the gangs are attached to the yoke by the clamp-plates $f f'$, so that the gangs may be adjusted on the yoke laterally and secured at any desired distance apart. The arches of the gangs are provided with suitable foot-pieces or rests J J′, by which the driver while on the seat, is enabled to move the gangs sidewise in either direction. Provision is made for allowing the gangs of teeth to play vertically, by means of springs on the rods K K′, and the upper ends of these rods are connected with the bent lower ends of the levers L L′, so that the gangs can be adjusted to spade to different depths, or raised entirely clear of the ground. It will also be understood that the gangs of teeth are reversible,—that is, they can be unclamped from the yoke, and replaced with the curved teeth pointing in the opposite directions, so as to throw the soil toward or away from the row of plants under cultivation. In addition to these adjustments and movements, the gangs are attached to the yokes so that they may be set with their axes at different angles in the horizontal plane,—the upper ends of the arches being provided with the radially notched heads $h\ h'$ which engage with corresponding notches in the heads $g\ g'$ attached to one of the clamp-plates $f\ f'$,—bolts $i\ i'$ being provided to secure the notched heads together in any desired position, with the axes of the gangs set at any desired angle with the line of draft. The gangs may also be set to work with their axes at any desired angle with the ground in the horizontal direction,—that is, with one end higher than the other, by means of the bolts $k\ k'$ and the curved row of holes $l\ l'$ in one of the plates $f f'$,—these plates being swung relatively to each other on the bolt $m$, Figs. 2 and 4, placed below the yoke. It will thus be perceived that provision is made for the adjustment of the gangs of spading teeth relatively to each other to any desired distance between their inner ends, that they can be moved together laterally as any crookedness in the row of plants under cultivation may require, that they are self-adjusting vertically, that the depth of cut may be varied, that the gangs can be raised entirely out of the soil, and that they may be reversed so as to throw the earth toward or away from the row, and they may be shifted about the vertical in such fashion as to vary the angles which their axes make with the line of draft,— and also that they may be set with their inner ends higher than the outer ends, or vice versa. The advantages of the curved rotating spading teeth in their opperation on the soil are at the same time preserved.

Proceeding to a more detailed description of the mechanism by which these adjustments and movements are secured, the gangs or sections of spading teeth may consist of any preferred number of blades M, Fig. 6, arranged in sets between the heads $j\,j'$, or of any preferred number of such sets.

In the accompanying drawings, I have shown four sets of spading teeth or blades, but I have obtained satisfactory results with two and three. A larger number may be used if desired. The shape of the blades will be understood from the accompanying drawings. They are perforated at the center for the shafts of the gangs, and are secured together at angles with each other, preferably in sets of three in each set, as indicated in Figs. 6, 7 and 8 of the drawings, in notches of different depths in the opposing faces of the collars or heads $j\,j'$. The collars are compelled to revolve with the blades by the angular projections $n$ which engage between the edges of the blades. The opposing faces of the collars may be recessed to save weight. The collars are separated from each other by the spools $o$, Fig. 3,—the whole gang being secured together by a central rod provided with a head on one end and a nut on the other. The spools $o$ revolve in the journal boxes $e\,e'$. The gangs may be provided with the clearers N, which consist of suitably curved bars, arranged on the rear side and attached at their lower ends to the journal-boxes $e\,e'$, and connected together at their upper ends by the bar $p$. The lower ends of the clearers are connected together by a bar, $q$, Fig. 3.

The arches I I' are connected to the clamp-plates $f\,f'$ by the notched heads $g\,g'$, $h\,h'$ and the bolts $i\,i'$, so that the axes of the gangs can be set at any required angle with the axle or the line of draft. The plates $f\,f'$ are attached together below the horizontal arms of the yoke H by the bolts $m$, and above the yoke by the bolts $k\,k'$. One of the plates, carrying the head $g$, is provided with a series of holes $l'$, arranged in a circle having the bolt $m$ as a center, so that, by inserting the upper bolt $k'$ in these holes, the axis of the gang may be set at an angle with the horizontal line,— with either end higher than the other. The clamp-plates permit the gangs to be secured to the yoke at different distances apart. The rods K K' are hooked at their lower ends and inserted in holes in the outer ends of the yoke,—the upper ends of the rods passing through the sockets $s\,s'$, and being provided with the springs $r\,r'$ which hold the gangs down to their work, but permit a certain amount of vertical movement. The sockets are pivoted in openings in the lower bent ends of the levers L L',—the pivot $q'$, Fig. 9 being secured in place by being riveted over. The opening in the socket $s$ through which the rod K passes is rounded or beveled on the inside, to permit the free movement of the rod. The rod is provided with washers on each side of the socket,—the upper one being secured in place by a pin or spring-key. At their lower ends the springs $r\,r'$ bear on the collars $t\,t'$, secured on the rods in any suitable way. The result of this construction is that the gangs are permitted to move upward, compressing the springs, on encountering lumps or irregularities in the soil, while at the same time they are permitted entire freedom of lateral movement or of adjustment, as already described.

The draw-bars F F' are pivoted to the front clamp-plates $f'$, as indicated at $u\,u'$, Fig. 1,— sufficient freedom being given to these joints to permit the movements of the gangs. One of the levers L is omitted from Fig. 1. The levers are pivoted to notched segments $v\,v'$ on the pole, and the lever is provided with any suitable spring-catch and actuating mechanism, so that the driver, by pulling the upper ends of the levers back, can raise the gangs, or one of them, so as to vary the depth of the cutting, or to lift them entirely free of the soil. The wheel next the observer is omitted in Fig. 2.

In Fig. 10 I have represented a modified form of the arch, I'', it being bent or curved backward, so that the yoke H is placed some distance in front of the axle, while the spading teeth are still kept in proper position for action on the ground between the lower portions of the wheels.

The seat-support E is carried by the braces $w$. The lateral movements of the gangs may be limited by the chains O O' Fig. 3.

For certain kinds of work, the guards or fenders P P' may be employed between the inner ends of the gangs. These guards consist of suitably shaped plates, attached to the draw-bars F F' by the bars $x\,x'$, and connected together so that they may be adjusted laterally to vary the distance between them, by means of the bolt $y$ passing through slots or a series of holes in arms on the plates. A chain Q may be employed to control the vertical position of the guards.

The yoke H may be a straight bar, as indicated by the dotted lines H', in Fig. 3.

My improved cultivator is cheap and durable in construction, and is adapted to a great variety of uses which will be understood by the practical farmer.

I claim—

1. The combination, of the wheels and frame of a cultivator, of the pair of laterally movable reversible rotating sections of gangs of radial curved spading teeth, the yoke H, the lifting rods K K', levers L L', and pivoted sockets $s\,s'$, said sockets having rounded or beveled openings to receive the rods, substantially as set forth.

2. The combination, with the wheels and frame of a cultivator, of a yoke, gangs of teeth mediately connected by the yoke, foot rests J, gang suspending rods loosely connected to the yoke, supporting springs $r\ r'$, sockets $s\ s'$ and levers L L' said sockets having a rounded or beveled opening to receive the rod and having a pivoted connection with the levers, substantially as set forth whereby movements of the gangs in various directions under the influence of the driver's foot or otherwise are permitted.

3. The devices for adjustably supporting gangs of cultivator teeth comprising the spring suspended yokes, the plates $f f'$ having holes $l\ l'$ and heads $g\ g'$, said plates being secured together by transverse bolts, arches I I' having heads $h\ h'$, securing bolts $i\ i'$ passing axially through the heads, said heads $g$ being offset from the plates $f$ and the foot rests J J' secured upon the top of the offset heads by the bolts that hold the heads together, whereby the gangs can be adjusted on either a vertical or horizontal axis and whereby they can be independently pushed in lateral direction, substantially as set forth.

4. The devices for adjustably supporting gangs of cultivator teeth comprising the spring suspended yokes, the plates $f f'$ having holes $l\ l'$ and heads $g\ g'$, said plates being secured together by transverse bolts, arches I I' having heads $h\ h'$, securing bolts $i\ i'$ passing axially through the heads, said heads $g$ being offset from the plates $f$ and the foot rests J J' secured upon the top of the offset heads by the bolts that hold the heads together, whereby the gangs can be adjusted on either a vertical or horizontal axis and whereby they can be independently pushed in lateral direction, and drawbars F F' pivotally connected to the pole and to the yoke clamping plates, substantially as set forth.

CHRIS MAUL.

Witnesses:
   HENRY S. MADDEN,
   WILLIAM P. MORGAN.